(12) United States Patent
Niu et al.

(10) Patent No.: US 9,715,443 B2
(45) Date of Patent: Jul. 25, 2017

(54) METHOD AND APPARATUS FOR MEMORY MANAGEMENT

(71) Applicant: Alibaba Group Holding Limited, George Town, Grand Cayman (KY)

(72) Inventors: Gongbiao Niu, Hangzhou (CN); Zhen Huang, Hangzhou (CN)

(73) Assignee: Alibaba Group Holding Limited, Grand Cayman (KY)

(*) Notice: Subject to any disclaimer, the term of this patent is extended or adjusted under 35 U.S.C. 154(b) by 0 days.

(21) Appl. No.: 14/952,847

(22) Filed: Nov. 25, 2015

(65) Prior Publication Data
US 2016/0147648 A1    May 26, 2016

(30) Foreign Application Priority Data

Nov. 25, 2014 (CN) .......................... 2014 1 0686872

(51) Int. Cl.
*G06F 9/50* (2006.01)
*G06F 12/02* (2006.01)

(52) U.S. Cl.
CPC .......... *G06F 12/023* (2013.01); *G06F 9/5016* (2013.01); *G06F 9/5061* (2013.01); *G06F 2212/1044* (2013.01)

(58) Field of Classification Search
CPC .............................. G06F 9/5016; G06F 9/5061
See application file for complete search history.

(56) References Cited

U.S. PATENT DOCUMENTS

| | | |
|---|---|---|
| 6,304,884 B1 | 10/2001 | Garst et al. |
| 6,327,606 B1 | 12/2001 | Chidambaran |
| 6,381,682 B2 * | 4/2002 | Noel ..................... G06F 9/5077 711/147 |
| 6,571,262 B2 | 5/2003 | Garst et al. |
| 6,701,420 B1 | 3/2004 | Hamilton et al. |
| 6,718,451 B2 | 4/2004 | Lawton et al. |
| 6,738,886 B1 * | 5/2004 | Mendoza .............. G06F 9/5016 711/173 |
| 6,804,766 B1 | 10/2004 | Noel et al. |
| 6,981,244 B1 | 12/2005 | Kathail et al. |
| 6,999,416 B2 | 2/2006 | Wang et al. |
| 7,088,713 B2 | 8/2006 | Battle et al. |

(Continued)

FOREIGN PATENT DOCUMENTS

EP 1650655 4/2006

*Primary Examiner* — Edward Dudek, Jr.

(57) ABSTRACT

A method and apparatus of memory management are disclosed. Pooling of at least one memory to generate a memory pool, dividing the memory pool to generate at least one memory space, and allocating a respective memory space to a respective CPU in a one-to-one correspondence manner are performed. Further, the respective memory space allocated to the respective CPU is set as a pinned memory of the respective CPU. Additionally, setting unallocated memory space as a shared memory pool, obtaining a memory value that represents usage of the respective memory space by the respective CPU during operation, and determining if the memory value exceeds a preset threshold range are performed. Selecting, if the memory value exceeds the preset threshold range, additional memory space from the memory pool to allocate to the respective CPU or reallocating at least a portion of the respective memory space allocated to the CPU are performed.

22 Claims, 3 Drawing Sheets

(56) References Cited

U.S. PATENT DOCUMENTS

| | | |
|---|---|---|
| 7,136,381 B2 | 11/2006 | Battle et al. |
| 7,181,585 B2 | 2/2007 | Abrashkevich et al. |
| 7,231,504 B2 * | 6/2007 | Kashyap ............... G06F 9/5072 711/173 |
| 7,240,341 B2 | 7/2007 | Plimmer et al. |
| 7,305,538 B2 | 12/2007 | Garst et al. |
| 7,337,296 B2 | 2/2008 | Noel et al. |
| 7,519,059 B2 | 4/2009 | Battle et al. |
| 7,698,528 B2 | 4/2010 | Freeman et al. |
| 7,707,320 B2 | 4/2010 | Singhai et al. |
| 7,716,450 B2 | 5/2010 | Garst et al. |
| 7,827,375 B2 | 11/2010 | Abrashkevich et al. |
| 7,840,752 B2 | 11/2010 | Hu et al. |
| 7,953,008 B2 | 5/2011 | Tatpudi et al. |
| 8,209,510 B1 | 6/2012 | Thathapudi et al. |
| 8,274,971 B2 | 9/2012 | Battle et al. |
| 8,332,611 B2 * | 12/2012 | Kumar ................. G06F 9/5016 711/170 |
| 8,402,242 B2 | 3/2013 | Hu et al. |
| 8,555,279 B2 | 10/2013 | Nonaka et al. |
| 8,578,194 B2 | 11/2013 | Chow et al. |
| 8,599,694 B2 | 12/2013 | Tatapudi et al. |
| 8,954,695 B1 | 2/2015 | Thathapudi et al. |
| 9,063,844 B2 | 6/2015 | Higgins et al. |
| 9,274,839 B2 * | 3/2016 | Schluessler ........... G06F 9/5016 |
| 2002/0016891 A1 * | 2/2002 | Noel ..................... G06F 9/5077 711/153 |
| 2003/0093628 A1 * | 5/2003 | Matter ................. G06F 9/5016 711/153 |
| 2004/0243884 A1 | 12/2004 | Vu et al. |
| 2005/0114621 A1 * | 5/2005 | Lahiri .................. G06F 12/023 711/170 |
| 2009/0150640 A1 * | 6/2009 | Royer .................. G06F 9/5077 711/173 |
| 2013/0138840 A1 | 5/2013 | Kegel et al. |
| 2013/0275707 A1 | 10/2013 | Schenfeld et al. |

* cited by examiner

METHOD AND APPARATUS FOR MEMORY MANAGEMENT

CROSS-REFERENCE TO RELATED APPLICATION

This application claims priority to and the benefit of Chinese Patent Application No. 201410686872.8, filed on Nov. 25, 2014, which is incorporated herein by reference in its entirety.

TECHNICAL FIELD

The disclosure relates generally to the field of memory management and, more particularly, to a method and apparatus for managing computer memory.

BACKGROUND

Generally, there is a fixed ratio between memory size and CPU processor capability in a single server. When there is a need to increase the power of a CPU or the memory size, the common manner in which this process is performed is to add one or more servers. As a result, there is an increase in the overall capability of the CPU or the size of the memory. By simply adding additional servers in order to increase memory space or CPU processing capability, there can be a resulting over-capacity that results in a decrease in the utilization of the overall available CPU processing capability or memory usage that can be considered a waste of resources.

Currently, software-based solutions are available to address the above-described problems of the decreased usage rate of CPU or memory as well as the associated waste of resources. Such software-based solutions manage and dispatch memory in a service system by protocol of encapsulation.

However, the current solutions have drawbacks. For example, a memory size is not capable to perform dynamic propagation when memory usage needs to be replicated. Moreover, due to the use of protocols of encapsulation at the software level, a CPU in a server system tends to utilize a relatively large amount of memory to process these protocols, causing a certain amount of delay in time and decrease in the processing efficiency of the server system.

SUMMARY OF THE DISCLOSURE

Embodiments of the disclosure provide methods and apparatus of memory management. Also, embodiments of the disclosure provide techniques to address the shortcomings of conventional solutions by providing better memory management and CPU processing allocation.

Accordingly, one embodiment of the disclosure provides a method of memory management. The method includes generating a memory pool, dividing the memory pool to generate at least one memory space, and allocating a respective memory space to a respective CPU in a one-to-one correspondence manner. The respective memory space is set as a pinned memory of the respective CPU. The method further includes setting an unallocated memory space as a shared memory pool of the memory pool. That is, the unallocated memory space includes memory space that remains unallocated in the memory pool. The method further includes obtaining a memory value that represents usage of the respective memory space by the respective CPU during operation and determining if the memory value exceeds a preset threshold range. The method yet further includes selecting, if the memory value exceeds the preset threshold range, additional memory space from the memory pool to allocate to the respective CPU and/or reallocating a portion of the respective memory space allocated to the respective CPU.

According to another embodiment of the disclosure, a device for memory management is provided. The device includes a memory pooling unit to generate a memory pool. The device further includes a memory divider to divide to memory pool to generate at least one memory space. Also, the memory divider is operable to allocate a respective memory space to a respective CPU in a one-to-one correspondence manner. The respective memory space is set as a pinned memory of the respective CPU. An unallocated memory space is set as a shared memory pool of the memory pool. That is, the unallocated memory space includes memory space that remains unallocated or is not pinned memory in the memory pool. The device yet further includes a memory value obtaining unit to obtain a memory value that represents usage of the respective memory space by the respective CPU during operation. Also, the device includes a memory value determination unit to determine if the memory value exceeds a preset threshold range. The device further includes a manager to select additional memory space from the memory pool to allocate to the respective CPU and/or to reallocate at least a portion of the respective memory space allocated to the respective CPU. The memory value determination unit is operable to commence the manager if the memory value exceeds the preset threshold range.

Further, another embodiment of the disclosure provides a system for memory management. The system includes instructions to generate at least one memory pool, instructions to divide the memory pool to generate at least one memory space, and instructions to allocate a respective memory space to a respective CPU in a one-to-one correspondence manner. The respective memory space is set as a pinned memory of the respective CPU. The system further includes instructions to set an unallocated memory space as a shared memory pool of the memory pool. That is, the unallocated memory space includes memory space that remains unallocated in the memory pool. The system further includes instructions to obtain a memory value that represents usage of the respective memory space by the respective CPU during operation and instructions to determine if the memory value exceeds a preset threshold range. The system yet further includes instructions to select, if the memory value exceeds the preset threshold range, additional memory space from the memory pool to allocate to the respective CPU and/or instructions to reallocate at least a portion of the respective memory space allocated to the respective CPU.

This summary includes, by necessity, simplifications, generalizations, and omissions of detail; consequently, those skilled in the art will appreciate that the summary is illustrative only and is not intended to be in any way limiting. Other aspects, inventive features, and advantages of the disclosure, as defined solely by the claims, will become apparent in the non-limiting detailed description set forth below.

BRIEF DESCRIPTION OF THE DRAWINGS

Embodiments of the disclosure will be better understood from a reading of the following detailed description, taken in conjunction with the accompanying drawings, in which like reference characters designate like elements.

DETAILED DESCRIPTION

Reference will now be made in detail to embodiments, examples of which are illustrated in the accompanying drawings. While the disclosure will be described in conjunction with the embodiments, it will be understood that they are not intended to limit the disclosure to these embodiments. On the contrary, the disclosure is intended to cover alternatives, modifications, and equivalents which may be included within the spirit and scope of the disclosure as defined by the appended claims. Furthermore, in the following detailed description of embodiments, numerous specific details are set forth in order to provide a thorough understanding of the disclosure. However, it will be recognized by one of ordinary skill in the art that embodiments may be practiced without these specific details. In other examples, well-known methods, procedures, and components have not been described in detail so as not to unnecessarily obscure aspects of embodiments. Further, embodiments of the disclosure provide a method and an apparatus of memory management in a server system. There can be embodiments based on other types of systems which is not limited here.

Figure 1A:
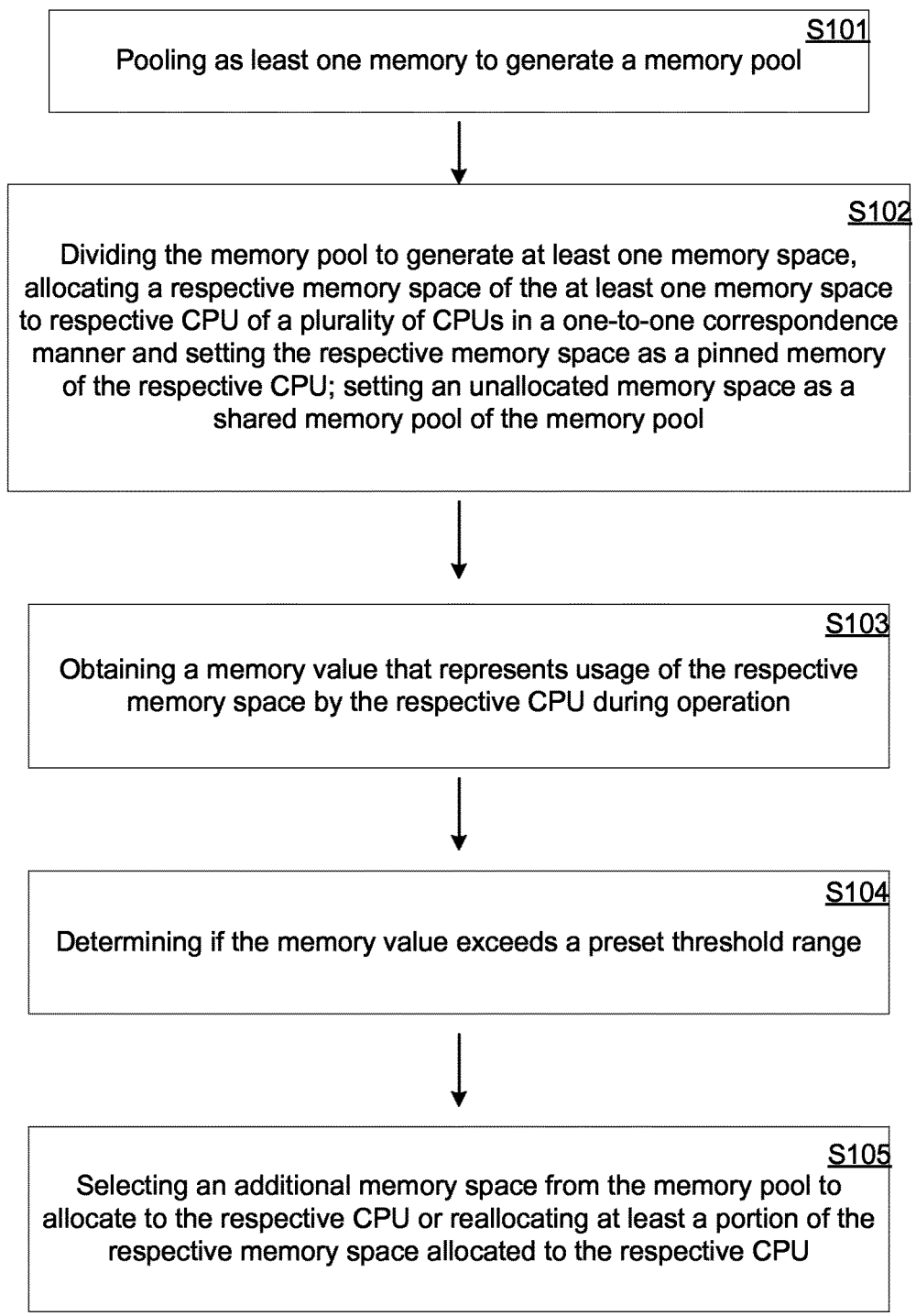
FIG. 1A is a flow diagram of a method of memory management according to an embodiment.

FIG. 1A shows a method of memory management. In step S101, at least one memory is pooled to generate a memory pool.

The memory mentioned in step S101 may be a memory managed by a memory controller configured by a server in a server system.

Pooling includes, but not limited to, the setting of each memory managed by a memory controller configured by the server in the server system as a node, and the connecting of the nodes in the server system through a logic chip or a logic device to create a memory pool in units of the nodes.

In an embodiment of the disclosure, at least one memory is pooled. There are additional steps after the pooling operation to create the memory pool.

Each CPU configured for each server in the server system is set as a CPU node. The CPU nodes are interconnected through a logic chip or a logic device to create a CPU pool that includes the CPU nodes.

The pooling of the memories in the server system and the pooling of the CPUs realize a physical decoupling of the memory and the CPU in the server system. Therefore, as a result of this physical decoupling, unconstrained configurations between the memories and CPUs in the server system can be accomplished. That is, the number of the memories in the server system can be increased or decreased individually due to these unconstrained configurations. Additionally, the number of the CPUs in the server system may also be increased or decreased individually by the unconstrained configurations to avoid a needless lack of usage of memory and CPU resources.

Additionally, there may be other ways or examples to implement or configure the pooling of memories and the CPUs that are not being addressed in detail herein.

In step S102, the memory pool is divided to generate at least one memory space, each of the memory spaces being allocated respectively to a plurality of CPUs in a one-to-one correspondence manner. The memory space allocated to a CPU is set as a pinned memory of the CPU, and the unallocated memory space is set as a shared memory pool of the memory pool. That is, the unallocated memory space includes memory space that remains unallocated in the memory pool.

Assuming the number of the CPUs in the server system is "n" and the number of the memory controllers is "m," where (n<m), the steps to divide the memory pool to generate at least one memory space to allocate to a respective CPU and set the allocated memory space as the pinned memory of the respective CPU are described next.

(1) Initially, selecting a number of memory controllers equal to the number of the CPUs in the plurality of CPUs. Here, from the above-described "m" memory controllers, "n" memory controllers are randomly selected as the "n" memory controller corresponding to the "n" CPUs to establish a one-to-one mapping relationship.

According to an embodiment of the disclosure, the relationships between the memory controllers and the CPUs are one-to-one correspondence relationships. There are other types of correspondence relationships between the memory controllers and the CPUs such as in a one-to-many or many-to-one manner, which can be easily configured but will not be addressed in detail herein.

(2) Next, generating a set of relationships between "n" Quick Path Interconnect "QPI" port addresses of the "n" CPUs with "n" port addresses of the "n" memories in a one-to-one correspondence manner; allocating a corresponding memory space of at least one dual in-line memory module "DIMM" slot in at least one channel under each memory controller of the "n" memory controllers to the CPU that has a one-to-one corresponding relationship with the memory controller, the corresponding memory space to be set as the pinned memory of the CPU. The allocating is repeated until all the CPUs in "n" CPUs have obtained pinned memories.

The Quick Path Interconnect "QPI" is a packet transmission-based high-speed serial point-to-point connecting agreement that is used by CPU to access data. The DIMM or dual in-line memory module is a module that includes one or more random-access memory chips on a small circuit board with pins that connect to the computer motherboard.

A memory controller selects a memory for use to manage the exchange of data between the memory and the CPU. Each memory controller can support 2-4 DDR (Double data rate synchronous dynamic random-access memory) channels, each channel can support 1-3 DIMM slots, for 1-3 memory chips. The memory space of each of memory chips corresponds to the memory space of the DIMM slots.

In another embodiment according to the disclosure, the memory space which corresponds to at least one DIMM slot in at least one channel that is controlled by each memory controller is allocated to the CPU. The allocation of the memory space is performed in a one-to-one corresponding relationship as the pinned memory of the CPU.

For example, the corresponding memory spaces of 4 DIMM slots in 2 channels controlled by each memory controller are allocated to the CPU that is in a one-to-one corresponding relationship with the memory controller, and the corresponding memory spaces being set as the pinned memory of the CPU, which is shown in Table 1 including:

The corresponding memory space of 3 DIMM slots (DIMM 1, DIMM 2 and DIMM 3) in the first channel (channel 01) under each memory controller and the corresponding memory space of 1 DIMM slot (DIMM 1) in the second channel (channel 02) are allocated respectively to each CPU of "n" CPUs as the pinned memory of each CPU in "n" CPUs.

The unallocated memory space, which remains in the memory pool, is set as the shared memory pool. The parts in the Table 1 including the corresponding memory spaces of DIMM 2 and DIMM 3 in channel 02, and the corresponding memory spaces of DIMM 1, DIMM 2, and DIMM 3 in channel 03 and channel 04 controlled by each memory controller are set as the shared memory pool.

TABLE 1

| CPU-QPI port address | Memory controller port address | Channel | DIMM slot |
|---|---|---|---|
| 1 | 1 | 01 | DIMM 1 |
|  |  |  | DIMM 2 |
|  |  |  | DIMM 3 |
|  |  | 02 | DIMM 1 |
|  |  |  | DIMM 2 |
|  |  |  | DIMM 3 |
|  |  | 03 | DIMM 1 |
|  |  |  | DIMM 2 |
|  |  |  | DIMM 3 |
|  |  | 04 | DIMM 1 |
|  |  |  | DIMM 2 |
|  |  |  | DIMM 3 |
| 2 | 2 | 01 | DIMM 1 |
|  |  |  | DIMM 2 |
|  |  |  | DIMM 3 |
|  |  | 02 | DIMM 1 |
|  |  |  | DIMM 2 |
|  |  |  | DIMM 3 |
|  |  | 03 | DIMM 1 |
|  |  |  | DIMM 2 |
|  |  |  | DIMM 3 |
|  |  | 04 | DIMM 1 |
|  |  |  | DIMM 2 |
|  |  |  | DIMM 3 |
| 3 | 3 | ... | ... |
| ... | ... | ... | ... |
| n | N | ... | ... |
|  | n + 1 | ... | ... |
|  | n + 2 | ... | ... |
|  | n + 3 | ... | ... |
|  | ... | ... | ... |
|  | M | ... | ... |

In the above embodiment according to the disclosure, the address of the memory space of the memory chip is a fixed address. That is to say the address of the corresponding memory space of the DIMM slot is a fixed address.

There are other possible embodiments to implement the addresses of the corresponding memory space of a DIMM slot. An example is allocating a real time address by the server system. Other address implementation techniques will not be explained into detail here.

In step S103, a memory value that represents usage of the respective memory space by the respective CPU during operation is obtained.

In this embodiment, the memory values that represent usage of the respective memory space by each CPU during operation is obtained for each of the above-described "n" CPUs.

It should be noted that the memory value used by each CPU during operation of all "n" CPUs obtained by the operating system in the server system includes the memory value used by the operating system and the memory value used by application programs.

Other than the above-mentioned ways to obtain the used memory values, there are additional ways that are not going to be described in detail here.

In this embodiment, the memory values that represent usage of the respective memory space by the respective CPU during operation in "n" CPUs are obtained. These memory values are obtained by setting each CPU of "n" CPUs as a determining unit to determine if the memory value used by the CPU exceeds a preset threshold range. According to the determination, further operation is taken such as whether to allocate additional memory space from the shared memory pool to the CPU, or to free part of original memory space that has been allocated to the CPU.

Besides the method mentioned above, there are other ways for determining the memory space needed. For example, to obtain memory values used by each CPU during operation of "n" CPUs, all the memory values used by at least one CPU during operation of "n" CPUs can be summed up to obtain an overall memory value used by at least one CPU during operation. Then, it is determined if the overall memory value used by at least one CPU during operation exceeds a preset threshold range. According to the determination, either additional memory space is selected from the shared memory pool, which is allocated to each of the CPUs, or the memory space is freed or released.

In step S104, a determination is made as to whether the memory value exceeds a preset threshold range.

In this step, the memory values of each CPU during operation of "n" CPUs are used to determine if each memory value exceeds a preset threshold range of each CPU.

As an example, one CPU of "n" CPUs is used in the process to determine if the memory value exceeds a preset threshold range of the CPU, including:

(1) Determining if the memory value used by the CPU during operation exceeds a preset first threshold.

If the memory value used by the CPU during operation exceeds a preset first threshold, then step S105 is initiated to apply for additional memory space from the shared memory pool according to a certain proportion of the memory value, and to allocate the additional memory space to the corresponding CPU.

If the memory value used by the CPU during processing does not exceed a preset first threshold, a next step is initiated to determine if the memory value used by the CPU during processing is less than a preset second threshold.

(2) Determining if the memory value used by the CPU during operation is less than the preset second threshold.

If the memory value used by the CPU during operation is less than the preset second threshold, in step S105, the memory space allocated to the CPU is partially released according to a certain proportion of the memory value. The process of releasing memory continues until the memory space allocated to the CPU reaches the pinned memory.

If the memory value used by the CPU during operation is not less than a preset second threshold, the process returns to step S103 to obtain the memory values used by each of the CPUs of "n" CPUs.

In addition to these solutions, there are other ways to implement the steps. For example, it can be determined in turn for "n" CPUs if the memory values used by each CPU during operation of "n" CPUs exceed a preset first threshold, and/or it can be determined in turn for "n" CPUs if the memory values used by each CPU during operation of "n" CPUs is less than a preset second threshold. Then the mentioned determining steps are repeated "n" times until all "n" CPUs have been processed by the determining process. This repetition process will not be discussed in further detail here.

For the embodiment according to the disclosure, corresponding to step S103, to obtain the memory values used by each CPU during operation of "n" CPUs, all the memory values used by at least one CPU during operation of "n" CPUs are summed up to obtain an overall memory value used by at least one CPU during processing. Next, it is determined if the overall memory value used by at least one CPU during operation exceeds a preset threshold range. According to the determination, either additional memory space is selected from the shared memory pool, which is allocated to each of the CPUs, or the memory space is freed or reallocated.

In step S104, the determining of whether the overall memory value used by at least one CPU during operation exceeds a preset threshold range can be implemented as described next.

(1) Determining if the overall memory value used by at least one CPU of the "n" CPUs during operation exceeds a preset first threshold.

If the overall memory value used by at least one CPU during operation exceeds a preset first threshold, at least one additional memory space is applied from the memory pool according to a certain proportion of the memory value such that to be allocated to each CPU in the at least one CPU in a one-to-one corresponding manner.

If the overall memory value used by at least one CPU during operation does not exceed a preset first threshold, a next step is initiated to determine if the overall memory value used by at least one CPU during operation is less than a preset second threshold.

(2) Determining if the overall memory value used by at least one CPU during operation is less than the preset second threshold.

If the overall memory value used by at least one CPU during operation is less than the preset second threshold, the memory space allocated to each CPU in the at least one CPU is partially released according to a certain proportion of the memory value. The process of releasing memory continues until the memory spaces allocated to each CPU in the at least one CPU reaches the size of the pinned memory.

If the overall memory value used by at least one CPU during operation is not less than the preset first threshold, the process returns to step S103 to obtain the memory values used by each CPU of "n" CPUs.

In step S105, additional memory space is applied from the memory pool to allocate to the CPU, or the memory space allocated to the CPU is reallocated or freed.

A precondition for implementing step S105 is that, in step S104, it is determined the memory value used by a CPU during processing exceeds a preset first threshold, or the memory value used by a CPU during processing is less than a preset second threshold.

If the memory value used by a CPU during processing exceeds the preset first threshold, one additional memory space is applied from the memory pool according to a certain proportion of the memory value to be allocated to the CPU.

If the memory value used by a CPU during operation is less than the preset second threshold, the memory space allocated to the CPU is partially released until the memory spaces allocated to the CPU reaches the size of the pinned memory.

It should be noted that, in this embodiment, when applying additional memory spaces from the memory pool according to a certain proportion of the memory value to be allocated to the CPU, the corresponding memory space of the DIMM slot in the same channel or the corresponding memory space of DIMM slot in the same memory controller will be allocated to the CPU, as described next.

(1) Initially, determining if there exists a DIMM slot in the memory pool located in the same channel controlled by the same memory controller as the DIMM slot that corresponds to the pinned memory of the CPU.

If there is such a DIMM slot in the memory pool located in the same channel under the same memory controller as the DIMM slot that corresponds to the pinned memory, then the corresponding memory space of the DIMM slot is allocated to the CPU according to a certain proportion of the memory value.

For example, in a memory pool for the corresponding memory space of the DIMM slot in the same channel controlled by the same memory controller with the DIMM slot corresponding to the pinned memory of the CPU, the size of the memory space applied from the memory space of the corresponding DIMM slot will be equivalent to 20% of the memory value used by the CPU during operation. This is the amount to be allocated to the CPU.

If there does not exist a DIMM slot in the memory pool located in the same channel under the same memory controller as the DIMM slot that corresponds to the pinned memory, a next step is initiated to determine if there exists a DIMM slot in the memory pool located in the same memory controller as the DIMM slot that corresponds to the pinned memory, which is described in the following.

(2) It is determined if there is a DIMM slot in the memory pool locating in the same memory controller as the DIMM slot that corresponds to the pinned memory. If there is a DIMM slot in the memory pool located in the same memory controller as the DIMM slot that corresponds to the pinned memory, the corresponding memory space of the DIMM slot is allocated to the CPU according to a certain proportion of the memory value.

For example, in the memory pool, for the corresponding memory space of the DIMM slot in the same memory controller with the DIMM slot corresponding to the pinned memory of the CPU, the size of the memory space applied from the memory space of the corresponding DIMM slot will be equivalent to 20% of the memory value used by the CPU during operation, which is allocated to the CPU.

If there does not exist a DIMM slot in the memory pool located in the same memory controller as the DIMM slot that corresponds to the pinned memory, the memory space in the shared memory pool is allocated to the CPU according to a certain proportion of the memory value.

For example, the memory space applied from the shared memory pool will be equivalent to the size of 20% of the memory value used by the CPU during operation, which is allocated to the CPU.

There are other possible embodiments to implement the above-described application of memory space from the shared memory pool for allocation to a CPU, which will not be explained in detail herein.

Similarly, the step of releasing or reallocating memory spaces from the memory pool according to a certain proportion of the memory value may be implemented in other ways corresponding to the above mentioned method.

For example, for the corresponding memory space of the DIMM slot in the same memory controller with the DIMM slot corresponding to the pinned memory of the CPU, the size of the memory space released will be equivalent to 20% of the memory value used by the CPU during operation.

There are other possible methods to implement the releasing or reallocating of the memory space, which will not be explained in detail herein.

It should be noted that steps S103, S104, and S105 are in a cyclic process of determination. The memory values used by each CPU during operation of "n" CPUs are obtained in step S103. Whether the memory values used by each CPU during operation of "n" CPUs exceeds a preset threshold range is determined in step S104. Based on the result of step S104, in step S105, additional memory space is selected from the shared memory pool to be allocated to the CPU or the memory space allocated to the CPU is reallocated or freed.

The cyclic determination process of steps S103, S104, and S105 implement a real time monitoring of the memory values used by the CPU during processing. According to the result of the monitoring, certain memory space is allocated to the CPU or certain memory space of the CPU is released such that the memory is utilized in a proper way and the functionality of the server system is enhanced.

Further, corresponding to the steps S103 and S104, according to the obtained memory values used by each CPU during operation of "n" CPUs, all the memory values used by at least one CPU during operation of "n" CPUs are summed up to obtain an overall memory value used by at least one CPU during operation. Next, it is determined if the overall memory value used by at least one CPU during operation exceeds a preset threshold range. According to the result of the determination, either additional memory space is selected from the shared memory pool, which is allocated to each CPU in the at least one CPU, or the memory space is reallocated or freed.

The steps of applying for additional memory space from the shared memory pool to allocate to each CPU in the at least one CPU are further described next.

(1) First, it is determined, in turn, if there is exists a DIMM slot in the shared memory pool located in the same channel as each DIMM slot that corresponds to a pinned memory of each CPU in the at least one CPU.

If there is such a DIMM slot in the shared memory pool located in the same channel as each DIMM slot that corresponds to a pinned memory of each CPU in the at least one CPU, the corresponding memory space of the DIMM slot is then allocated to the CPU according to a certain proportion of the memory value.

If there does not exist a DIMM slot in the shared memory pool locating in the same channel as a DIMM slot that corresponds to a pinned memory of each of the CPUs, a next step is initiated to determine if there exists a DIMM slot in the shared memory pool located in the same memory controller as the DIMM slot that corresponds to a pinned memory of each CPU in the at least one CPU.

(2) It is determined if there is a DIMM slot in the shared memory pool located in the same memory controller as the DIMM slot that corresponds to a pinned memory of each CPU of the set of CPUs.

If there is a DIMM slot in the shared memory pool located in the same memory controller as the DIMM slot that corresponds to a pinned memory of each CPU of the set of CPUs, the corresponding memory space of the DIMM slot is allocated to the CPU according to a certain proportion of the memory value.

If such DIMM slot does not exist in the shared memory pool locating in the same memory controller as the DIMM slot that corresponds to a pinned memory of each CPU in the at least one CPU, the memory space in the shared memory pool is allocated to the CPU according a certain proportion of the memory value.

The above-described process of determination is repeated until memory is allocated from each of the at least one CPU. Also, other embodiments are possible for implementation without limitation to the above-described process.

Figure 1B:
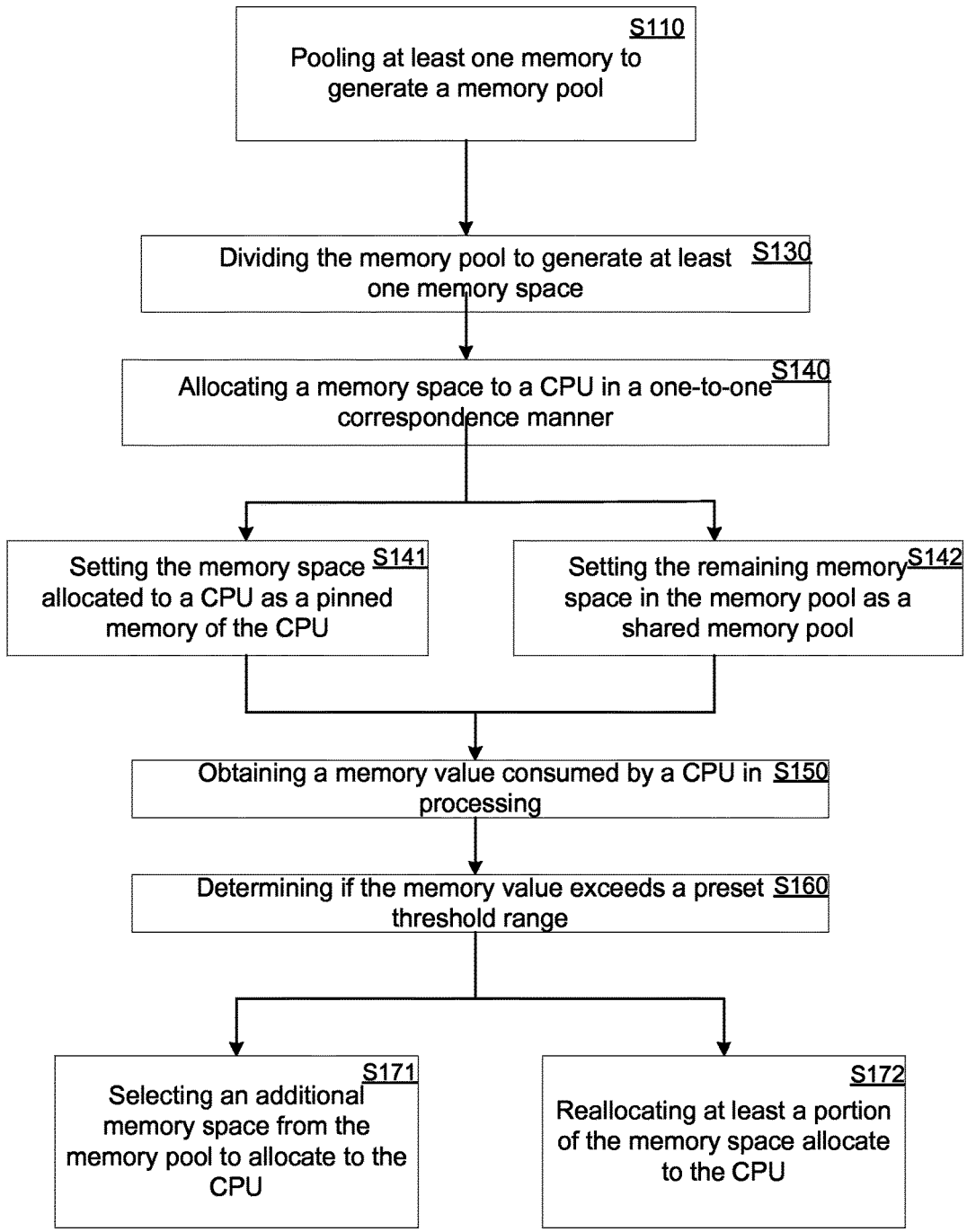
FIG. 1B is a flow diagram of a method of memory management according to an embodiment.

FIG. 1B shows a flow diagram of a method of memory management according to another embodiment of the disclosure. In step S110, at least one memory is pooled to generate a memory pool. In step S130, the memory pool is divided to generate at least one memory space. In step S140, each of the memory spaces is allocated respectively to a plurality of CPUs in a one-to-one correspondence manner. In step S141, the one-to-one allocated respective memory space is allocated to a respective CPU as a pinned memory of the respective CPU. In step S142, unallocated memory space is set as a shared memory pool of the memory pool. That is, the unallocated memory space includes memory space that remains unallocated in the memory pool.

In step S150, a memory value that represents usage of the respective memory space by the respective CPU during operation is obtained. In step S160, it is determined as to whether the memory value obtained in step S150 exceeds a preset threshold range. If the memory value used by the CPU during operation exceeds a preset first threshold, then step S171 is initiated to apply for additional memory space from the shared memory pool according to a certain proportion of the memory value and to allocate the additional memory space to the corresponding CPU. If the memory value used by the CPU during operation is less than the preset second threshold, in step S172, the memory space allocated to the CPU is partially released according to a certain proportion of the memory value.

Figure 2:
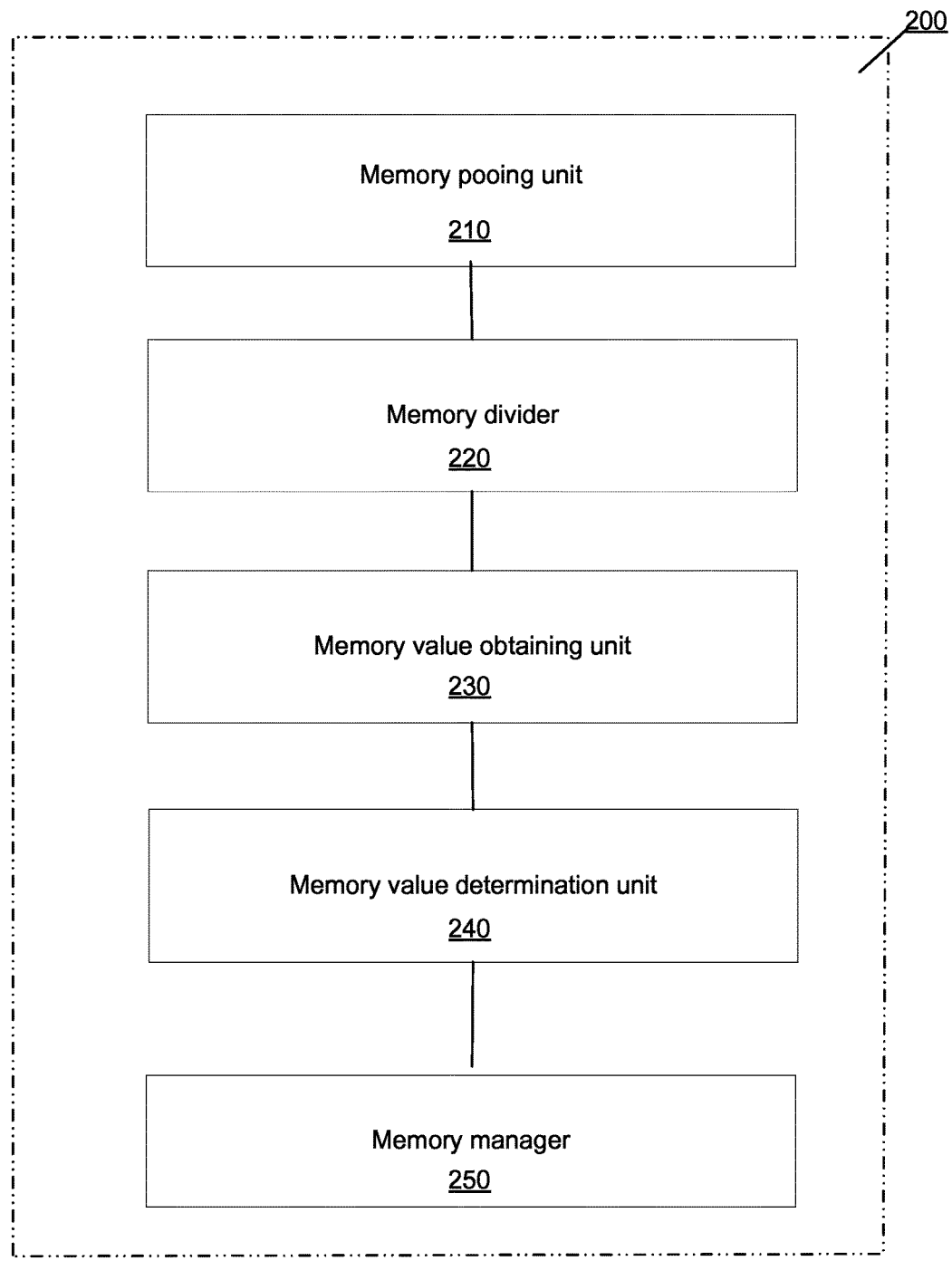
FIG. 2 is a block diagram of an apparatus of memory management according to an embodiment.

In FIG. 2 there is shown another embodiment of the disclosure of a device 200 of memory management that includes the following units.

A memory pooling unit 210 configured to pool at least one memory to generate a memory pool.

A memory divider 220 divides the memory pool to generate at least one memory space and allocates a respective memory space to a respective CPU in a one-to-one correspondence manner. The respective memory space allocated to a respective CPU is set as a pinned memory of the respective CPU. An unallocated memory space is set as a shared memory pool of the memory pool. That is, the unallocated memory space includes memory space that remains unallocated or is not pinned memory in the memory pool.

A memory value obtaining unit 230 obtains a memory value that represents usage of the respective memory space by the respective CPU during operation. A memory value determination unit 240 determines if the memory value exceeds a preset threshold range and whether to commence a memory manager 250 if the memory value exceeds the preset threshold range.

The memory manager 250 is configured for selecting additional memory space from the shared memory pool to allocate to the CPU and/or releasing or reallocate the memory space allocated to the CPU if the threshold is exceeded.

Alternatively, the memory divider 220 includes a memory controller selecting sub-module configured for selecting a set of memory controllers, the number of memory controllers is equal to the number of the set of CPUs. It also includes an allocator sub-module configured for matching a QPI port address of the CPU with a port address of the memory controller in a one-to-one correspondence manner and for allocating the corresponding memory space of at least one DIMM slot in at least one channel under the memory controller to the CPU. The corresponding memory is set as a pinned memory of the CPU and the corresponding memory address of the DIMM slot is a fixed address.

Alternatively, the device 200 also includes a CPU pooling unit configured for setting each CPU in a set of CPUs as a node of the set of CPUs and for connecting all the nodes of the set of CPUs to generate a CPU pool.

In a typical configuration, a computing device includes one or more CPUs, an input/output port, an Internet port, and a memory.

According to the disclosure, the computer-readable media do not include the transitory media, such as the modulate data signal and carrier. The computer-readable media disclosed include, but not limit to, the phase-change memory (PRAM), static random-access memory (SRAM), dynamic random-access memory (DRAM), other types of the random-access memory (RAM), read-only memory (ROM), electrically erasable programmable read-only memory (EEPROM), flash RAM and other memory technologies, compact disc read-only memory (CD-ROM), digital video disc (DVD) and other optical storage, magnetic tape, magnetic disc, other magnetic storage, and any other non-transition media It is appreciated that the skilled in the art understands the disclosure may be implemented as the methods, systems, and/or the instructions for a computer. It is intended that the disclosure may be implemented as hardware, software, and/or hardware and software combined. The disclosure may be implemented as a computer program product utilizing one or more storage mediums including computer program instructions. The storage medium includes, but not limit to, the phase-change memory (PRAM), static random-access memory (SRAM), dynamic random-access memory (DRAM), other types of the random-access memory (RAM), read-only memory (ROM), electrically erasable programmable read-only memory (EEPROM), flash RAM and other memory technologies, compact disc read-only memory (CD-ROM), digital video disc (DVD) and other optical storage, magnetic tape, magnetic disc, other magnetic storage, and any other storage type.

Although certain embodiments and methods have been disclosed herein, it will be apparent from the foregoing disclosure to those skilled in the art that variations and modifications of such embodiments and methods may be made without departing from the spirit and scope of the disclosure. It is intended that the disclosure be defined by the appended claims and the rules and principles of applicable law.

What is claimed is:

1. A method for memory management, comprising:
pooling at least one memory to generate a memory pool;
dividing the memory pool to generate at least one memory space;
allocating a respective memory space of the at least one memory space to a respective CPU of a plurality of CPUs in a one-to-one correspondence manner and setting the respective memory space as a pinned memory of the respective CPU;
setting an unallocated memory space as a shared memory pool of the memory pool;
obtaining a memory value that represents usage of the respective memory space by the respective CPU during operation;
determining if the memory value exceeds a preset threshold range; and
based on whether the memory value exceeds the preset threshold range, selecting an additional memory space from the memory pool to allocate to the respective CPU, or reallocating at least a portion of the respective memory space that has been allocated to the respective CPU;
selecting a number of memory controllers, wherein the number of memory controllers is equal to a number of the respective CPUs;
matching in a one-to-one correspondence manner port addresses of the respective CPUs to port addresses of the memory controller; and
allocating a corresponding memory space of at least one dual in-line memory module (DIMM) slot of the memory pool in at least one channel associated with the memory controllers to the respective CPU as the pinned memory, wherein the allocated corresponding memory space of the DIMM slot includes a fixed address.

2. The method of claim 1, wherein the obtaining a memory value comprises:
obtaining the memory values of the respective CPUs from the plurality of CPUs.

3. The method of claim 2, wherein the determining if the memory value exceeds a preset threshold range comprises:
determining if at least one of the memory values exceeds a preset first threshold; and
if the memory value exceeds the preset first threshold, selecting the additional memory space from the memory pool according to a certain proportion of the memory value and allocating the additional memory space to the respective CPU.

4. The method of claim 3, further comprising:
determining, if the memory value does not exceed a preset first threshold, if the memory value is lower than a preset second threshold; and
if the memory value does not exceed the preset first threshold and if the memory value is lower than the preset second threshold, reallocating at least a portion of the respective memory space allocated to the respective CPU according to a certain proportion of the memory value.

5. The method of claim 4, further comprising:
if the memory value is not lower than the preset second threshold, repeating the obtaining a memory value, the determining if the memory value exceeds the preset threshold range, and the based on whether the memory value exceeds the preset threshold range, selecting an additional memory space from the memory pool to allocate to the respective CPU or reallocating the respective memory space allocated to the respective CPU.

6. The method of claim 3, wherein the selecting additional memory space from the memory pool comprises:
determining if there exists a second DIMM slot of the memory pool located in the same channel as the DIMM slot that corresponds to the pinned memory of the respective CPU; and
if the second DIMM slot exists, allocating a second corresponding memory space of the second DIMM slot to the respective CPU according to the certain proportion of the memory value.

7. The method of claim 6, further comprising:
if the second DIMM slot does not exist, determining if there exists a third DIMM slot in the memory pool located in the memory controllers as the DIMM slot that corresponds to the pinned memory of the respective CPU;
if the third DIMM slot exists, allocating a third corresponding memory space of the third DIMM slot to the respective CPU according to the certain proportion of the memory value; and
if the third DIMM slot does not exist, allocating the additional memory space from the memory pool to the respective CPU according to another certain proportion of the memory value.

8. The method of claim 2, wherein the obtaining the memory values comprises:
summing the memory values of the respective CPUs from the plurality of CPUs to obtain a total memory value.

9. The method of claim 8, wherein the determining if the memory value exceeds a preset threshold range comprises:
determining if the total memory value exceeds a preset first threshold; and
if the total memory value exceeds the preset first threshold, selecting the additional memory space from the memory pool according to a certain proportion of the memory value and allocating the additional memory space to the respective CPU.

10. The method of claim 9, further comprising:
determining, if the total memory value does not exceed a preset first threshold, if the total memory value is lower than a preset second threshold;
if the total memory value does not exceed the preset first threshold and if the total memory value is lower than the preset second threshold, reallocating at least a portion of the respective memory space allocated to the respective CPU according to a certain proportion of the memory value; and
if the memory value is not lower than the preset second threshold, repeating the obtaining a memory value, the determining if the memory value exceeds the preset threshold range, and the based on whether the memory value exceeds the preset threshold range, selecting an additional memory space from the memory pool to allocate to the respective CPU or reallocating the respective memory space allocated to the respective CPU.

11. The method of claim 9, wherein the selecting additional memory space from the memory pool comprises:
determining if there exists a second DIMM slot of the shared memory pool located in the same channel as the DIMM slot that corresponds to the pinned memory of the respective CPU;
if the second DIMM slot exists, allocating a second corresponding memory space of the second DIMM slot to the respective CPU according to the certain proportion of the memory value;
if the second DIMM slot does not exist, determining if there exists a third DIMM slot in the shared memory pool located in the respective memory controller as the DIMM slot that corresponds to the pinned memory of the respective CPU;
if the third DIMM slot exists, allocating a third corresponding memory space of the third DIMM slot to the respective CPU according to the certain proportion of the memory value; and
if the third DIMM slot does not exist, allocating the additional memory space from the memory pool to the respective CPU according to the certain proportion of the memory value.

12. An apparatus for memory management, comprising:
a memory pooling unit configured to pool at least one memory to generate a memory pool;
a memory divider configured to divide the memory pool to generate at least one memory space, to allocate a respective memory space to a respective CPU of a plurality of CPUs in a one-to-one correspondence manner, wherein the respective memory space allocated to the respective CPU is set as a pinned memory of the respective CPU, and to set an unallocated memory space as a shared memory pool of the memory pool, the memory divider including:
a selector configured to select a set of memory controllers, wherein a number of the set of memory controllers is equal to the number of the plurality of CPUs; and
an allocator configured to match a port address of the respective CPU with the port address of the memory controller in a one-to-one correspondence manner and to allocate the respective memory space that corresponds to at least one dual in-line memory module (DIMM) slot in at least one channel controlled by the memory controller to the respective CPU, wherein the respective memory space is set as a pinned memory of the respective CPU, and wherein a memory address that corresponds to the DIMM slot includes a fixed address;
a memory value obtaining unit configured to obtain a memory value that represents usage of the respective memory space by the respective CPU during operation; and
a memory value determination unit configured to determine if the respective memory value exceeds a preset threshold range to commence a manager,
wherein the manager is configured to select additional memory space from the memory pool to allocate to the respective CPU or to reallocate at least a portion of the respective memory space allocated to the respective CPU.

13. A method of managing a memory comprising:
pooling a plurality of memory chips to form a memory pool, the plurality of memory chips being coupled to a plurality of memory controllers, the plurality of memory controllers being coupled to a plurality of CPUs, a first CPU being coupled to a first memory controller, each memory controller having a plurality of channels, each channel being coupled to one or more memory chips;
dividing the memory pool to form a plurality of pinned memory spaces and an unallocated memory space, the plurality of pinned memory spaces including a first pinned memory space, the first pinned memory space including a memory space of one or more memory chips in one or more channels of the first memory controller;
allocating the plurality of pinned memory spaces to the plurality of CPUs, the first pinned memory space being allocated to the first CPU;
obtaining a first memory value that represents usage of the first pinned memory space by the first CPU during operation;
determining if the first memory value exceeds an upper threshold;
when the first memory value exceeds the upper threshold, determining if a channel of the first memory controller is coupled to one or more memory chips that include both the first pinned memory space and a portion of the unallocated memory space; and
when a channel of the first memory controller is coupled to one or more memory chips that include both the first pinned memory space and the portion of the unallocated memory space, adding the portion of the unallocated memory space to the first pinned memory space to form a first increased memory space, and allocating the first increased memory space to the first CPU.

14. The method of claim 13 wherein the portion of the unallocated memory space is equal to 20% of the first memory value.

15. The method of claim 13, further comprising:
when no channel of the first memory controller is coupled to one or more memory chips that include both the first pinned memory space and the portion of the unallocated memory space, determining if a channel of the first memory controller is coupled to a memory chip that only includes a part of the unallocated memory space; and
when a channel of the first memory controller is coupled to a memory chip that only includes the part of the unallocated memory space, adding the part of the unallocated memory space to the first pinned memory space to form the first increased memory space, and allocating the first increased memory space to the first CPU.

16. The method of claim 15, further comprising:
when no channel of the first memory controller is coupled to a memory chip that only includes the part of the unallocated memory space, determining if a channel of a second memory controller is coupled to a memory chip that includes a piece of the unallocated memory space, the second memory controller being coupled to a second CPU of the plurality of CPUs; and
when a channel of the second memory controller is coupled to a memory chip that includes the piece of the unallocated memory space, adding the piece of the unallocated memory space to the first pinned memory space to form the first increased memory space, and allocating the first increased memory space to the first CPU.

17. The method of claim 16, further comprising:
obtaining a second memory value that represents usage of the first increased memory space by the first CPU during operation;
determining if the second memory value exceeds the upper threshold;
when the second memory value falls below the upper threshold, determining if the second memory value falls below a lower threshold; and
when the second memory value falls below the lower threshold, subtracting a section of the first increased memory space to form a reduced memory space, and reallocating the reduced memory space to the first CPU.

18. The method of claim 16, wherein:
the plurality of pinned memory spaces further includes a second pinned memory space, the second pinned memory space including a memory space of one or more memory chips in one or more channels of the second memory controller, the second pinned memory space being allocated to the second CPU;
further comprising:
obtaining a second memory value that represents usage of the second pinned memory space by the second CPU during operation;
determining if the second memory value exceeds the upper threshold;
when the second memory value exceeds the upper threshold, determining if a channel of the second memory controller is coupled to one or more memory chips that include both the second pinned memory space and a section of the unallocated memory space; and
when a channel of the second memory controller is coupled to one or more memory chips that include both the second pinned memory space and the section of the unallocated memory space, adding the section of the unallocated memory space to the second pinned memory space to form a second increased memory space, and allocating the second increased memory space to the second CPU.

19. The method of claim 16, further comprising:
obtaining a total memory value that represents usage of each pinned memory space by the each CPU during operation;
determining if the total memory value exceeds a preset threshold;
when the total memory value exceeds the preset threshold, adding a segment of the unallocated memory space to each pinned memory space.

20. A non-transitory machine-readable medium having stored thereon sequences of instructions to be executed by a processor, the sequences of instructions including a method comprising:
pooling a plurality of memory chips to form a memory pool, the plurality of memory chips being coupled to a plurality of memory controllers, the plurality of memory controllers being coupled to a plurality of CPUs, a first CPU being coupled to a first memory controller, each memory controller having a plurality of channels, each channel being coupled to one or more memory chips;
dividing the memory pool to form a plurality of pinned memory spaces and an unallocated memory space, the plurality of pinned memory spaces including a first pinned memory space, the first pinned memory space including a memory space of one or more memory chips in one or more channels of the first memory controller;
allocating the plurality of pinned memory spaces to the plurality of CPUs, the first pinned memory space being allocated to the first CPU;
obtaining a first memory value that represents usage of the first pinned memory space by the first CPU during operation;
determining if the first memory value exceeds an upper threshold;
when the first memory value exceeds the upper threshold, determining if a channel of the first memory controller is coupled to one or more memory chips that include both the first pinned memory space and a portion of the unallocated memory space; and
when a channel of the first memory controller is coupled to one or more memory chips that include both the first pinned memory space and the portion of the unallocated memory space, adding the portion of the unallocated memory space to the first pinned memory space to form a first increased memory space, and allocating the first increased memory space to the first CPU.

21. The method of claim 20, further comprising:
when no channel of the first memory controller is coupled to one or more memory chips that include both the first pinned memory space and the portion of the unallocated memory space, determining if a channel of the first memory controller is coupled to a memory chip that only includes a part of the unallocated memory space; and
when a channel of the first memory controller is coupled to a memory chip that only includes the part of the unallocated memory space, adding the part of the unallocated memory space to the first pinned memory space to form the first increased memory space, and allocating the first increased memory space to the first CPU.

22. The method of claim 21, further comprising:

when no channel of the first memory controller is coupled to a memory chip that only includes the part of the unallocated memory space, determining if a channel of a second memory controller is coupled to a memory chip that includes a piece of the unallocated memory space, the second memory controller being coupled to a second CPU of the plurality of CPUs; and when a channel of the second memory controller is coupled to a memory chip that includes the piece of the unallocated memory space, adding the piece of the unallocated memory space to the first pinned memory space to form the first increased memory space, and allocating the first increased memory space to the first CPU.

\* \* \* \* \*